United States Patent
Machizawa et al.

(10) Patent No.: US 6,263,696 B1
(45) Date of Patent: Jul. 24, 2001

(54) AIR-COOLED ABSORPTION TYPE CHILLER HEATER AND MODIFICATION METHOD

(75) Inventors: Kenji Machizawa, Chiyoda; Yukio Hukushima, Kawasaki; Hidenori Iwao, Abiko; Isao Katou, Tutiura; Keiji Tachibana, Tokyo, all of (JP)

(73) Assignee: Hitachi Building Systems Co., Ltd. (JP)

( * ) Notice: Subject to any disclaimer, the term of this patent is extended or adjusted under 35 U.S.C. 154(b) by 0 days.

(21) Appl. No.: 09/496,354

(22) Filed: Feb. 2, 2000

(51) Int. Cl.[7] .................................................. F25B 15/00
(52) U.S. Cl. ................................................ 62/476; 62/497
(58) Field of Search .............................. 62/476, 483, 497, 62/324.2

(56) References Cited

U.S. PATENT DOCUMENTS

| | | | |
|---|---|---|---|
| 3,491,552 | * | 1/1970 | Roeder, Jr. ............................. 62/476 |
| 4,955,359 | | 9/1990 | Briggs et al. . |
| 6,101,839 | * | 8/2000 | Reimann et al. ....................... 62/476 |

FOREIGN PATENT DOCUMENTS

| | | |
|---|---|---|
| 3 338 126 A1 | 10/1983 | (DE) . |
| 0 681 152 | 11/1995 | (EP) . |
| 2 155 609 | 9/1985 | (GB) . |
| 2 280 494 | 2/1995 | (GB) . |
| 2 311 363 | 9/1997 | (GB) . |
| 11-223432 | 8/1999 | (JP) . |

OTHER PUBLICATIONS

Search Report, European Patent Office, Jun. 30, 2000, 4 pages.
"The Oil Flame That Cools", Fuel Oil & Heat, p. 82, May, 1957.*

* cited by examiner

Primary Examiner—William Doerrler
Assistant Examiner—Melvin Jones
(74) Attorney, Agent, or Firm—Nixon Peabody LLP; Jeffrey L. Costellia

(57) ABSTRACT

In an absorption type chiller heater, a generator is heated in order to heat a refrigerant-mixed solution to generate refrigerant vapor. This heating is generally carried out by causing high-temperature combustion gas to flow in contact with heat transfer fins, which are provided on the periphery of the generator. The aforesaid burner uses a burner of liquid-fuel combustion structure to produce a longer flame as compared to that of a gas burner. The extremity of the lengthened flame coming into contact with the heat transfer fins can cause problems such that the fins are locally overheated to burn out. In this view, the present invention arranges a flame buffer plate between the liquid fuel burner and the heat transfer fins and provides a curved flame channel. This forms a curved flame, whereby the flame, despite of its great length, is kept from its extremity coming into contact with the heat transfer fins. Besides, the flame channel, even if long, is curved to prevent larger outer dimensions of the entire chiller heater.

6 Claims, 3 Drawing Sheets

AIR-COOLED ABSORPTION TYPE CHILLER HEATER AND MODIFICATION METHOD

BACKGROUND OF THE INVENTION

1. Field of the Invention

The present invention relates to an ammonia absorption chiller heater with air-cooling means and a modification method therefor.

2. Description of the Related Art

An absorption chiller heater in Japanese Patent Laid-Open Publication No.Hei 11-223432 is publicly known which uses ammonia as a refrigerant and water as an absorbent and is equipped with air-cooling means.

Description will here be given of the known art mentioned above.

In a generator, ammonia aqueous solution is heated to generate ammonia vapor.

This heating is performed by using a gas burner.

The ammonia aqueous solution having ammonia vapor generated therefrom makes dilute ammonia water.

The ammonia vapor generated in the generator is introduced to a condenser. The vapor is circulated through a heat exchanger while air-cooled by a cooling fan, thereby being condensed into liquid ammonia.

The condensed liquid ammonia is let through an expansion valve for pressure reduction, and fed to an evaporator.

In the evaporator, the liquid ammonia evaporates into ammonia vapor, which consumes heat of evaporation to cool brine. This cooled brain is circulated through cool/heat loads to offer a refrigeration effect or cooling effect.

Meanwhile, the dilute ammonia water obtained through the generation of ammonia vapor in the generator described above is introduced through a pressure-reducing valve and sprayed into the upper part of an absorber. At the same time, the ammonia vapor having evaporated in the evaporator is also introduced to the absorber mentioned above.

In this absorber, the dilute ammonia water absorbs the ammonia vapor to make dense ammonia aqueous solution, which is sent back to the aforementioned generator by a solution pump. The ammonia aqueous solution is then reheated by the gas burner to generate ammonia vapor therefrom, making diluted ammonia water again.

Subsequently, these processes are repeated to carry out the refrigeration cycle.

As has been described above, the known art uses a gas burner to heat ammonia aqueous solution in the generator.

The use of a gas burner is advantageous for compact configuration of the entire absorption chiller heater. However, gaseous fuel is high in cost per calorie and therefore uneconomical as compared to liquid fuel.

Under such circumstances, conversion of the gas burner into a fuel oil burner is desired by users.

Liquid fuel is, however, greater in specific gravity and viscosity as compared to gaseous fuel. Therefore, liquid fuel needs to be atomized by spraying so as to mix with air, which elongates the flame.

Long flames from a burner give rise to a problem as follows:

The generator of an absorption chiller heater typically comprises heat transfer fins on its peripheries. Here, high-temperature gas produced by combustion flows in contact with the heat transfer fins to heat the entire generator.

If a flame reaches the heat transfer fins, the fins might locally be overheated until burned out, or combustion-produced solids might adhere to the fins to hamper the heat transfer. Thus, the burner must be placed so that the extremity of the flame cannot come to touch the heat transfer fins.

Accordingly, the longer the flame is, the greater the distance between the burner and the generator must be to establish a flame channel greater in length. This enlarges the entire shape and size of the absorption chiller beater. On this account, a wider floor space is required for installation.

SUMMARY OF THE INVENTION

In view of the foregoing, a main object of the present invention is to provide a method of modifying a ready-made absorption chiller heater that is designed and fabricated to use a gas burner into an absorption chiller heater for use with a fuel oil burner, without increasing the entire shape of the chiller heater.

Another object of the present invention is to provide an "absorption chiller heater using a fuel oil burner" which is nearly equal in shape and size to an absorption chiller heater using a gas burner.

The objects stated above are, in other words, to improve absorption chiller heaters of conventional examples on condition that the heat transfer fins never be overheated to burn out and the combustion-produced solids never be deposited on the heat transfer fins to hamper the heat transfer.

The foregoing objects have been achieved by the provision of the present invention whose basic principle is as follows:

The lengthy flame from a fuel oil burner is directed toward a flame buffer plate (to put it more correctly, the flame buffer plate is opposed straight to the shooting direction of the flame from the fuel oil burner). The flame buffer plate is formed of refractory material.

This flame buffer plate preferably is a member moderate in width, having such shape and size that the flame (i.e., the flow of burning gas) can make a detour around the flame buffer plate.

In such configuration, a long flame ejected from the fuel oil burner collides against the flame buffer plate, changing its flowing direction to make a detour around the flame buffer plate toward the generator. This accordingly forms a curved flame.

The flame ejected from the fuel oil burner is indeed long but curved. Therefore, the flame channel, which is formed in conformity to the curved shape of the flame, also has a curved shape.

In spite of its greater length, the flame channel is curved and therefore relatively small in outer dimensions. This allows the absorption chiller heater including the flame channel to be compact in outer dimensions.

According to the present invention, "the distance between the generator and the nozzle of the liquid fuel burner" in an air-cooled absorption type chiller heater with a liquid fuel burner is generally equalized to "the distance between the nozzle of the gaseous fuel burner and the generator." Besides, there is no danger of locally overheating the heat transfer fins of the generator or depositing combustion-produced solids thereon to hamper the heat transfer.

In addition, according to the present invention, air-cooled absorption type chiller heaters designed and fabricated to be equipped with a gas burner can be modified into air-cooled absorption type chiller heaters with a liquid fuel burner. The modification can be made without the danger of allowing flames to reach the heat transfer fins while suppressing increases in shape and size.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, preferred embodiments of the present invention will be described with reference to the accompanying drawings.

Figure 1:
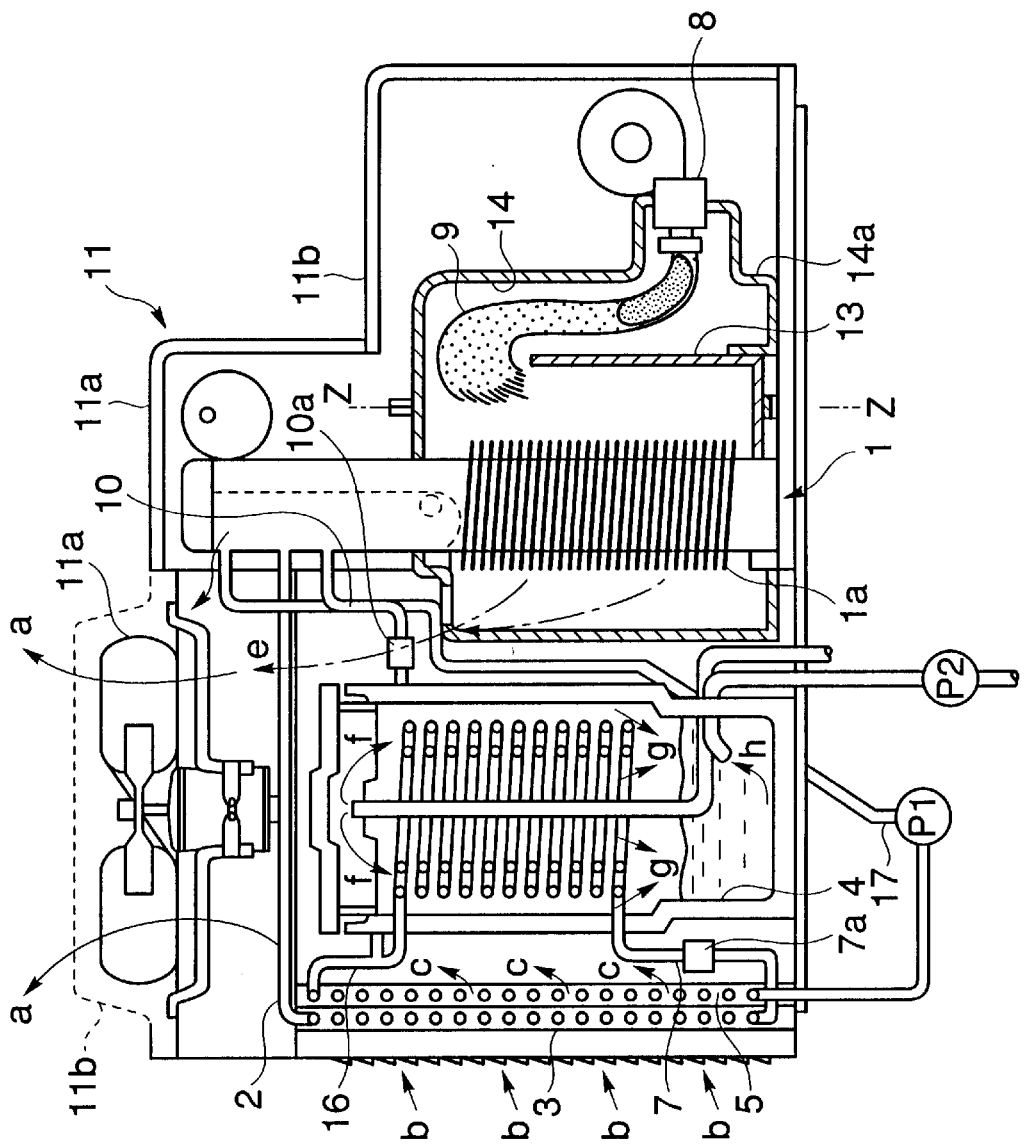
FIG. 1 is a general sectional view showing an embodiment of the air-cooled absorption type chiller heater of the present invention.

FIG. 1 shows an air-cooled ammonia absorption refrigerator, which is a modification example obtained by applying the present invention to a ready-made, air-cooled ammonia absorption type refrigerator equipped with a gas burner.

What is essential in the modification is to remove the gas burner and install a kerosene burner 8 instead. This modification involves the installation of the members shown on the right of the plane Z—Z and a kerosene burner cover 11d.

An air-cooled ammonia absorption type chiller heater has both functions of cooling and heating. The cooling (or refrigeration) function is the same as that of the air-cooled ammonia absorption type refrigerator.

An air-cooled ammonia absorption type refrigerator uses ammonia as a refrigerant and water as an absorbent. The ammonia absorption type refrigerator of FIG. 1 is essentially comprised of the following component members: a generator 1; a gun type of liquid fuel burner (kerosene burner) 8; a condenser 3; an evaporator 4; an absorber 5; and piping for connecting these devices. The refrigerator also comprises a fan 6 for supplying the condenser 3 with cooling air (shown by the arrows b and c). This means that the refrigerator is of air-cooled type.

The generator 1 contains ammonia aqueous solution which is to be heated by high-temperature combustion gas produced by the kerosene burner 8. To improve the efficiency of heat transfer in this heating, the generator 1 is provided with a number of heat transfer fins 1a.

Ammonia vapor is generated from the heated ammonia aqueous solution, thereby making dilute ammonia water. The dilute ammonia water is high in ability to absorb ammonia vapor as compared to dense ammonia aqueous solution.

The ammonia vapor having evaporated in the generator 1 is introduced through piping 2 to the condenser 3. Here, the vapor is cooled by cooling air (the arrows b and c) to condense into liquid ammonia. The heat of condensation emitted here is taken away by the cooling air (the arrows b and c) circulated by the fan 6.

The liquid ammonia having condensed in the condenser 3 is sent through piping 7 and a pressure reducer 7a to the coiled piping in the evaporator 4, whereby the liquid ammonia evaporates into ammonia vapor.

In evaporation, the liquid ammonia consumes the heat of evaporation to cool the brine (shown by the arrows f, g, and h) which flows in contact with the periphery of the aforementioned coiled piping.

Meanwhile, the dilute ammonia water having generated ammonia vapor in the generator 1 is introduced through piping 10 and a pressure reducer 10a to the absorber 5. The ammonia vapor evaporated in the evaporator 4 is also introduced through piping 16 to the absorber 5.

In the absorber 5, the dilute ammonia water absorbs the ammonia vapor to make dense ammonia aqueous solution.

While the ammonia vapor in the absorber 5 is absorbed into the diluted ammonia water, the absorber 5 is cooled by the cooling air of the fan 6. This decreases the pressure inside the absorber 5. As a result, new ammonia vapor generated in the evaporator 4 continuously flows into the absorber 5.

The dense ammonia aqueous solution created in the absorber 5 is let through piping 17 and is sent by a solution pump P1 to the aforementioned generator 1, whereby the solution is heated to generate ammonia vapor, making diluted ammonia water again.

The foregoing constitutes the refrigeration cycle which is continuously repeated to cool the brine in the evaporator 4. The cooled brine is circulated and fed by a brine pump P2 to e.g. fan coil units (not shown) provided in rooms, so as to fulfill the cooling function.

Now, description will be made on the configuration and function of the essential parts of the present invention.

Originally, on the right side of the plane Z—Z shown in FIG. 1 was mounted a gas burner. The gas burner had a number of nozzles in a planar arrangement so that the whole nozzles make a broad, short flame.

In the present invention, the above-mentioned gas burner is removed, and the kerosene burner 8 is mounted instead.

The modification by replacing a gas burner with the kerosene burner 8 as described above is applicable not only to ammonia absorption refrigerators but also to absorption type chiller heaters in general.

The above-mentioned modification can also be applied to existing absorption type chiller heaters. It is also applicable to unused, gas-burner-typed absorption type chiller heater. Moreover, the modification can be applied to semi-fabricated products which have been designed and fabricated to be equipped with a gas burner.

The aforementioned kerosene burner 8 has a flame nozzle which is generally horizontally directed to the heat transfer fins 1a of the generator 1. The generator 1 has a longitudinal, cylindrical shape. The upper half of the generator 1 serves as a vapor-liquid separating space, and the lower half acts as a heat-receiving zone. The heat transfer fins 1a are mounted generally horizontally on the periphery of the heat-receiving zone. Accordingly, the generally horizontal installation of the kerosene burner 8 toward the heat transfer fins 1a allows the burner 8 to be installed at a lower position.

The lower installation position of the kerosene burner 8 shifts the center of gravity of the entire chiller heater downward for higher stability. In addition, the lower installation position is advantageous to provide a vertical flame buffer plate and a curved flame channel.

Between the above-described kerosene burner 8 and the generator 1 is provided a flame buffer plate 13 of refractory material, which is faced generally perpendicular to the shooting direction of the flame from the kerosene burner 8. Thereby, the generally horizontal, lengthy flame ejected from the kerosene burner 8 collides against the flame buffer plate 13 mentioned above. Here, the collision forces the flame to make an upward detour. As shown in FIG. 1, a flame channel 14 is curved so as to introduce the flame to the upward detour. This forms a curved long flame 9 which will not reach the heat transfer fins 1a.

In the present embodiment, the flame buffer plate 13 is fixed to the external wall 14a of the flame channel, the wall 14a being formed of refractory material into a shape for installation on the coupling plane Z—Z. This "flame channel with a flame buffer plate" is then fastened by mounting flanges formed on the above-mentioned coupling plane Z—Z.

Figure 2:
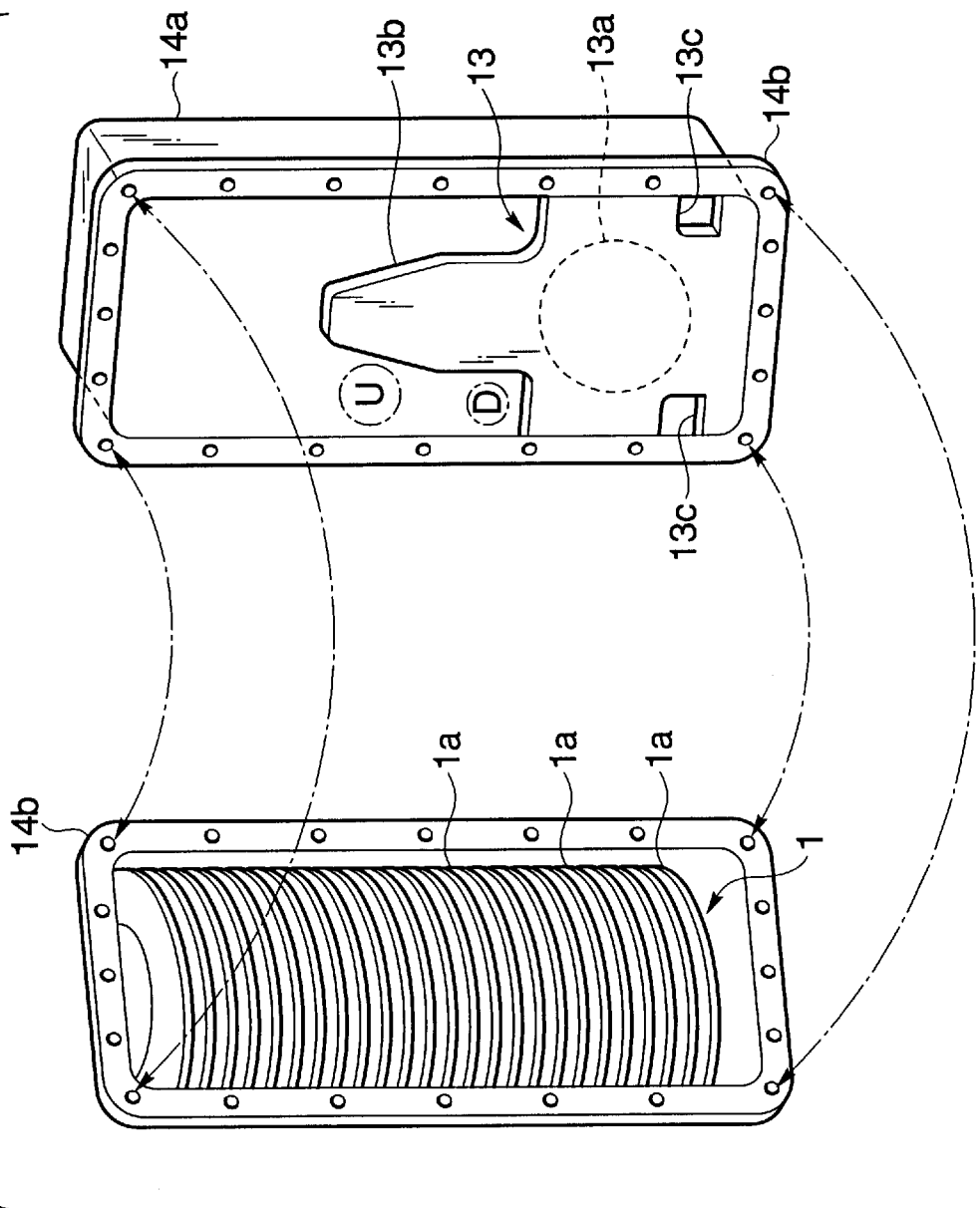
FIG. 2 is an exploded perspective view showing the essential parts of the embodiment of FIG. 1, taken along the plane Z—Z of FIG. 1.

FIG. 2 is an exploded perspective view showing the "flame channel with a flame buffer plate" of the air-cooled ammonia absorption refrigerator in the present embodiment shown in FIG. 1 above, being detached along the plane Z—Z.

The flame-channel external wall 14a in this FIG. 2 illustrates in a detached state the external wall 14a shown in FIG. 1 above. The reference numerals 14b designate the mounting flanges.

In an overview, the flame buffer plate 13 has an inverted T shape, with its lower half of a general rectangle under a tongue projecting upward.

In a little closer look, the plate 13 has a broad cross shape, whereas it is more like an inverted cross as compared to the general concept. Of its vertical bar, the portion extending upward is relatively long, and the leg extending downward is extremely short and broad.

The intersection of the vertical and horizontal bars (the central portion of the cross) is opposed straight to the flame jet nozzle of the kerosene burner 8 described above, constituting the main body of the flame buffer plate 13.

The upward-projecting tongue 13b is wide at the bottom (i.e., the lower half) and gets narrower into a taper as approaching the extremity thereof. There is a definite clearance between the extremity (upper end) of the tongue 13b and the ceiling of the flame-channel external wall 14a. The vicinity thereof constitutes the main path for the curved flame.

Comparison between this FIG. 2 and the forecited FIG. 1 shows that major part of the curved flame 9 passes above the tongue 13b while some other part of the same runs through the sides of the tongue 13b.

The spaces on both sides of the tongue 13b are obliquely above a portion 13a that is opposed straight to the above-mentioned burner. Since the tongue 13b is wide at its lower half and narrow at its upper half, the gaps by the tongue are narrow at the lower and wide at the upper. The flame passing therethrough is influenced in distribution by the points as follows:

For convenience of description, the following consideration will be made on qualitative comparison between the vicinity of the U portion (a lateral upper side by the tongue) and the vicinity of the D portion shown in FIG. 2.

The U portion is greater in breadth than the D portion, functioning to increase the flame that runs through the U portion.

The U-portion pass is a longer way than the D-portion pass. This functions to decrease the flame that runs through the U portion.

To take account of the inertia of the flame that collides against the main body 13a of the flame buffer plate 13 to turn, the U portion requires relatively smaller turning-radii for the turn, thereby decreasing the amount of the flame passing therethrough. Meanwhile, the D portion only needs relatively greater turning-radii for the turn, increasing the amount of the flame passing therethrough.

Calculating to design the quantitative distribution of the flame passing the vicinities of the tongue 13b in consideration of the influences described above is not very easy. It is, however, possible for those skilled in the art to obtain the distribution through experiments without any particular difficulties.

Here, the discussion has been made on the quantitative distribution of the flame at each detours because the high-temperature combustion gas flows to be fed to the heat transfer fins of the generator 1 should be made uniform in temperature distribution.

Accordingly, theoretical elucidation and designing calculation on the quantitative distribution of the flame are not always necessary. Experimental approaches by repeating measurement on the temperature distribution of the combustion gas with various shapes of flame buffer plates are practical in determining the appropriate shall for the flame buffer plate to offer desired temperature distribution.

As stated previously, the leg (the portion projecting downward from the horizontal beam) of the cross-like flame buffer plate 13 is extremely broad and short as shown in FIG. 2.

Both the right and left ends of the horizontal broad beam and the lower end of the broad, short leg are fixed to the external wall 14a. In assembling a combustion system by the method of the present invention, it is desirable to install the "flame-channel external wall 14a with a flame buffer plate 13" as illustrated in the figure.

Since the leg of the flame buffer plate 13 is broad and short as mentioned above, flame bypasses 13c formed on lower right and left of the main body 13a opposed straight to the burner are very small in area. Such flame bypasses are provided with an aim to "uniformize the temperature distribution of the combustion gas flows to be fed to the heat transfer fins 1a." Experimental approaches are therefore preferable in determining the position, size, and shape of the flame bypasses 13c.

In this FIG. 2, the flame bypasses 13c are formed by cutting away part of the flame buffer plate 13. In embodying the present invention, however, these flame bypasses may be formed by making through-holes or openings in the flame buffer plate.

The experiments by the present inventors show that the flame bypasses 13c appropriately have a total flow area not greater than 10% the total cross-sectional area of the paths. Flow areas above 10% haze the opposite effect of making nonuniform the temperature distribution of the combustion gas in the periphery of the heat transfer fins, facilitating to cause unfavorable results. Particularly, an increase of the flames running through the bypasses lengthens the bypass flames so that the extremities of the bypass flames approach the heat transfer fins. Therefore, the bypasses must not have very large areas.

Figure 3:
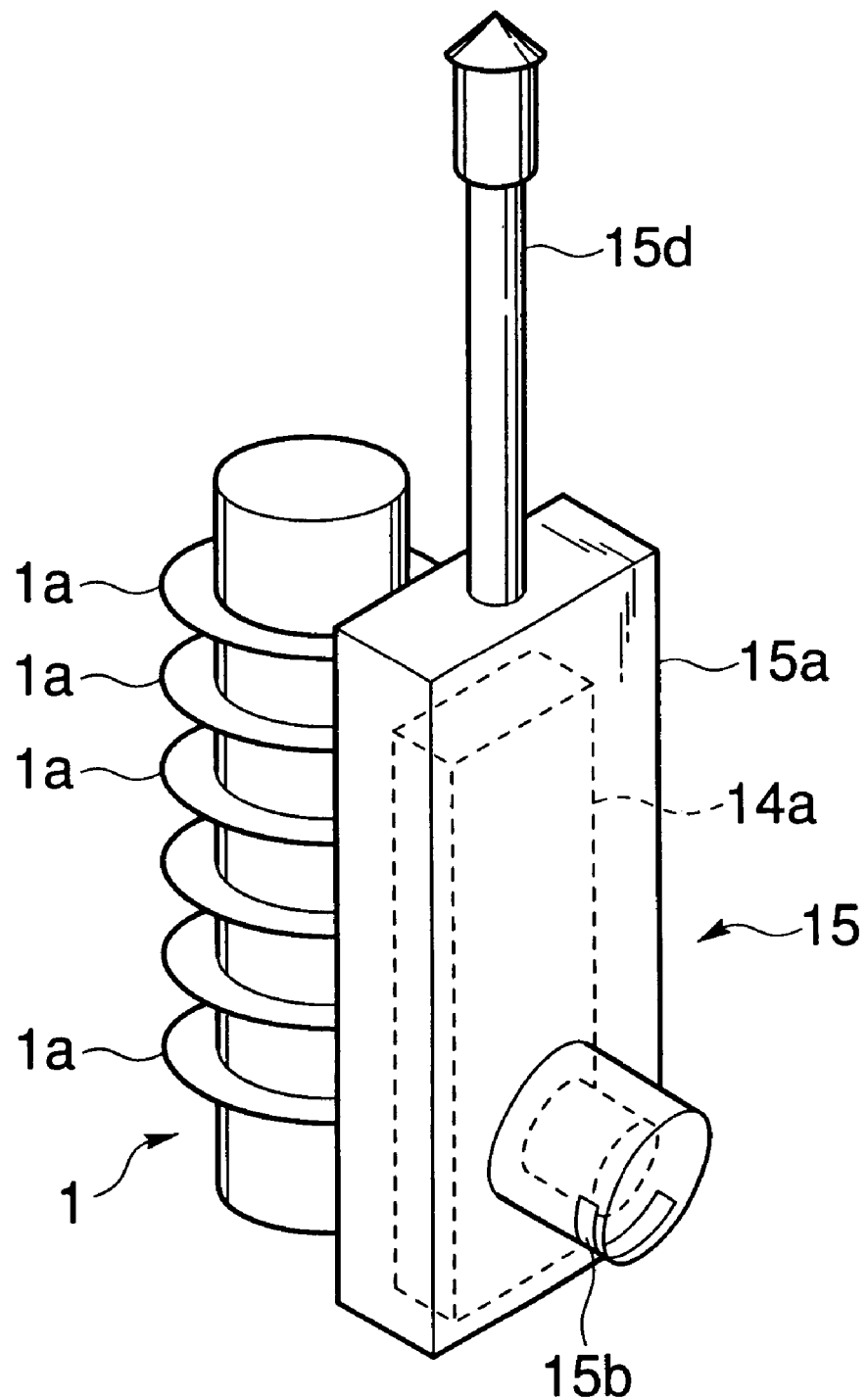
FIG. 3 is a perspective view showing the vicinity of what is shown in FIG. 2 with the casing removed.

FIG. 3 is an external perspective view of an embodiment of the air-cooled ammonia absorption refrigerator according to the present invention, the view exclusively illustrating a generator, a curved flame channel, and a heat-shield cover for covering the curved flame channel. Note that the illustration is given in a schematic fashion and therefore it does not exactly present the substantial projections of the members.

The reference numeral 14a designates an external wall of the curved flame channel, to which the same reference numeral is attached in the forecited FIG. 1. Opposed to the external wall 14a via gaps is the heat-shield cover 15. This heat-shield cover is formed of metal plates. The present embodiment uses uncoated stainless steel plates therefor.

As seen from FIG. 1, the curved flame channel 14 is arranged inside the casing of the air-cooled ammonia absorption refrigerator. Heat radiated from the flame channel 14 therefore increases the temperature inside the casing. Since the casing contains electronic components (not shown) for the control system, an excessive rise in the inside temperature of the casing might cause thermal damage to the electronic components. Thus, the temperature rise inside the casing needs to be suppressed, if possible.

In the present embodiment, the external wall 14a of the flame channel may be heated up to 300–800° C. Accordingly, the temperature rise inside the casing due to the radiant heat from the external wall 14a is not negligible.

The radiant heat mentioned above is blocked by the heat-shield cover 15. In particular, the heat-shield cover 15 favorably has specular gloss on its internal surfaces so that the radiation is reflected to suppress a rise in the temperature of the cover 15 itself.

Besides, the heat-shield cover 15 has a cooling-air inlet 15b in the vicinity of its lower end. Moreover, a chimney 15d is projected upward from the vicinity of the top of the heat-shield cover 15.

In FIG. 1, the heat-shield cover 15 is omitted of illustration. The chimney 15d mentioned above, in fact, is projected upward through the casing of the air-cooled ammonia absorption refrigerator to allow communication with the space above the refrigerator.

The air inside the refrigerator casing is inhaled through the cooling-air inlet 15b (FIG. 3). Here, the inhaled air comes into contact with the flame-channel external wall 14a to receive heat therefrom for cooling. The air having received the heat to increase in temperature expands to be lighter. This produces free convection so that the air rises up to be released through the chimney 15d. After this manner, the head-shield cover 15 blocks the radiant heat from the external wall 14a of the flame channel and cools the external wall 14a by means of convection as well, thereby suppressing the temperature rise inside the casing.

As can clearly be seen from the configuration and functions described above, the cooling of the flame-channel external wall 14a by the heat-shield cover 15 in the present embodiment requires no cooling fan motor to be installed. This avoids considerable increases in the equipment and material cost for the modification. The absence of cooling fan motors eliminates power consumption in cooling the external wall of the flame channel. The absence of cooling fan motors also eliminates the possibility of flame-channel cooling means producing vibrations and noises. This enables quiet, smooth, and sure cooling of the flame-channel external wall.

Now, description will be made as to the reason why in the present invention the cooling of the flame channel is regarded as of importance as described above. That is, when a curved flame channel is provided through the application of the present invention, the curve of the flame channel causes a rise in surface area. This develops a tendency to increase heat radiation from the flame channel. In order to correct the defect, much importance is attached to the suppression of the heat radiation from the flame channel.

In applying modifications in a broad sense (including design improvements) to a conventional, gas-fired type air-cooled ammonia absorption refrigerator to constitute the oil-fired type air-cooled ammonia absorption refrigerator shown in FIG. 1 (the embodiment), the kerosene burner 8 is somewhat large as compared to the conventional gas burner. Besides, the new flame channel is greater in outer dimensions due to its curve. Thus, the burner cover previously attached to the casing of the conventional example is removed and replaced with a kerosene burner cover 11d fabricated to constitute a modified casing 11. Among the component members of this modified casing 11, those on the left of the plane Z—Z in the figure are the same as those of the conventional casing. Thus, the application of this invention method requires only a small amount of cost for the casing work.

As described above the modified casing 11 (FIG. 1) is assembled by installing the kerosene burner cover 11d. By this means, the air-cooled ammonia absorption refrigerator modified into oil-fire type is provided with a style in appearance as a plant appliance, presenting a regular design for marketability.

While the present invention is intended to be applied to an air-cooled ammonia absorption refrigerator, a few components can be added to convert the apparatus dedicated for cooling into an apparatus for both cooling and heating.

Accordingly, the present invention is also applicable to an air-cooled ammonia absorption cooler heater as long as the cooler heater contains the components that can function as an air-cooled ammonia absorption refrigerator. In other words, even when the apparatus also comprises heating means, the method of applying the present invention to an air-cooled ammonia absorption refrigerator portion of the apparatus to make a gas-fired-to-oil-fired modification thereto and the air-cooled ammonia absorption refrigerator modified into an oil-fired type are considered as fall within the technical scope of the present invention.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An air-cooled absorption type chiller heater comprising:
    a generator for heating a refrigerant-mixed solution to generate refrigerant vapor, said generator being arranged on the way of a combustion gas channel;
    a heat transfer fin provided on a periphery of said generator;
    a burner for producing combustion gas flowing in contact with said heat transfer fin;
    a condenser for liquefying said refrigerant vapor; and
    an evaporator for evaporating the liquefied refrigerant liquor to cool brine, wherein
        said burner is a burner for burning liquid fuel, and
        a flame buffer plate made of refractory material is placed between said generator and a flame nozzle of said burner, so as to be opposed straight to said flame nozzle.

2. The air-cooled absorption type chiller heater according to claim 1, wherein:
    said flame buffer plate is a plate member generally along a vertical plane, having a cross shape or an inverted T shape;
    a portion extending upward from a horizontally-oblong, plate-like portion of said flame buffer plate is greater in width at its bottom than in the vicinity of its extremity; and the top of said portion extending upward is spaced away from a ceiling of said combustion gas channel.

3. The air-cooled absorption type chiller heater according to claim 1, wherein:

said flame buffer plate is a plate member generally along a vertical plane, having a cross shape or an inverted T shape;

said flame buffer plate has bypasses in both lower corners thereof; and said bypasses have a cross-sectional area not greater than 10% the cross-sectional area of said combustion gas channel at a position where said flame buffer plate is arranged.

4. An air-cooled absorption type chiller heater comprising:

a generator for heating an ammonia aqueous solution to generate ammonia vapor, said generator being arranged on the way of a combustion gas channel;

a heat transfer fin provided on a periphery of said generator;

a burner for producing combustion gas flowing in contact with said heat transfer fin;

a condenser for liquefying said ammonia vapor by air-cooling; and an evaporator for evaporating the liquefied liquid ammonia to cool brine, wherein said burner is a burner for burning liquid fuel, and a flame buffer plate made of refractory material is placed between said generator and a flame nozzle of said burner, so as to be opposed straight to said flame nozzle.

5. A method of modifying an air-cooled absorption type chiller heater to allow use of liquid fuel, said chiller heater comprising:

a generator for heating a refrigerant-mixed solution to generate refrigerant vapor, said generator being arranged on the way of a combustion gas channel;

a heat transfer fin provided on a periphery of said generator;

a burner for producing combustion gas flowing in contact with said heat transfer fin;

a condenser for liquefying said refrigerant vapor; and an evaporator for evaporating liquefied refrigerant liquor to cool brine, said burner being a burner for burning non-liquid fuel, wherein said method comprises the steps of replacing said burner burning non-liquid fuel with a liquid fuel burner, and providing a curved flame channel between said heat transfer fin of said generator and said liquid fuel burner so that a flame ejected from said liquid fuel burner is kept from coming into contact with said heat transfer fin.

6. The method of modifying an air-cooled absorption type chiller heater according to claim 5, wherein:

a flame buffer plate is attached to a flame-channel wall constituting said curved flame channel; and the flame-channel wall with a flame buffer plate is mounted on said combustion gas channel to form said curved flame channel.

* * * * *